United States Patent
Ravishankar et al.

(10) Patent No.: US 10,356,036 B2
(45) Date of Patent: Jul. 16, 2019

(54) GENERATING REPORTS FROM SHORT MESSAGE TYPE IDENTIFIERS BASED ON SPECIFIC ATTRIBUTES

(71) Applicant: Dell Products L.P., Round Rock, TX (US)

(72) Inventors: Deepak Ravishankar, Bangalore (IN); Mainak Roy, Kolkata (IN); Sharmad S. Naik, Bangalore (IN); Rathi B, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 664 days.

(21) Appl. No.: 14/796,058

(22) Filed: Jul. 10, 2015

(65) Prior Publication Data

US 2017/0011408 A1    Jan. 12, 2017

(51) Int. Cl.
| | |
|---|---|
| H04L 12/58 | (2006.01) |
| G06Q 30/02 | (2012.01) |
| G06Q 50/00 | (2012.01) |
| G06F 16/20 | (2019.01) |
| H04L 12/04 | (2006.01) |

(52) U.S. Cl.
CPC ............ *H04L 51/32* (2013.01); *G06F 16/20* (2019.01); *G06Q 30/0201* (2013.01); *G06Q 50/01* (2013.01); *H04L 12/04* (2013.01); *H04L 51/16* (2013.01)

(58) Field of Classification Search
None
See application file for complete search history.

(56) References Cited

U.S. PATENT DOCUMENTS

| | | | | |
|---|---|---|---|---|
| 8,909,771 | B2 * | 12/2014 | Heath | G06Q 30/02 705/39 |
| 9,189,774 | B2 * | 11/2015 | Rao | G06Q 10/107 |
| 9,317,594 | B2 * | 4/2016 | de Ville | G06F 17/3071 |
| 2012/0254152 | A1 * | 10/2012 | Park | G06Q 30/02 707/710 |
| 2013/0073277 | A1 * | 3/2013 | Mills | G06F 17/2229 704/9 |

(Continued)

OTHER PUBLICATIONS

Nambu, http://nambu.en.softonic.com/mac, printed Feb. 1, 2016.

(Continued)

*Primary Examiner* — Gurkanwaljit Singh
(74) *Attorney, Agent, or Firm* — Terrile, Cannatti & Chambers; Stephen A. Terrile

(57) ABSTRACT

A system, method, and computer-readable medium are disclosed for providing a short message tool for identifying and correlating relationships between and among multiple short messages. The short message tool collates the short message data from all company related short messages and generates a report and create a map between the contents, customers and the revenue. Such a multiple short message tool defines a workflow to generate a report from multiple short messages. More specifically, in certain embodiments the customized report may be customized based on based on lines of business (LOBs), number of short messages and re-generation of short messages (referred to as re-tweets when the short messages are Twitter type short messages), favorites, and information about individual users.

18 Claims, 6 Drawing Sheets

(56) References Cited

U.S. PATENT DOCUMENTS

| | | | |
|---|---|---|---|
| 2013/0073336 A1* | 3/2013 | Heath | G06Q 30/02 705/7.29 |
| 2014/0067557 A1* | 3/2014 | van Niekerk | G06Q 30/0623 705/14.73 |
| 2014/0172513 A1* | 6/2014 | MacLean | G06Q 30/018 705/7.39 |
| 2014/0279731 A1* | 9/2014 | Yakovenko | G06N 99/005 706/12 |
| 2015/0025977 A1* | 1/2015 | Doyle | G06Q 50/01 705/14.66 |

OTHER PUBLICATIONS

Hootsuite, https://hootsuite.com/, printed Feb. 1, 2016.
Wikipeda, SEESMIC Desktop, https://en.wikipedia.org/wiki/Seesmic, printed Feb. 1, 2016.

\* cited by examiner

GENERATING REPORTS FROM SHORT MESSAGE TYPE IDENTIFIERS BASED ON SPECIFIC ATTRIBUTES

BACKGROUND OF THE INVENTION

Field of the Invention

The present invention relates to information handling systems. More specifically, embodiments of the invention relate to generating reports for multiple short message type identifiers.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to user information handling systems to communicate with groups of users by delivering short messages. For example, many companies have a large presence over social media platforms. As an example, Twitter® has become an increasingly popular platform for delivering short messages to an associated group of users. A company may have a large number of short message user names (often referred to as handles) on each of these platforms. Each short message user name includes an associated user name identifier such as an associated universal resource locator (URL). With the social media platforms used by the company, individual handles may target specific audiences that vary with the business. These individual handles can generate a large amount of data. These data are amplified by individuals over multiple channels.

Accordingly, it can be challenging to generate a clear matrix of the relationships between these multiple handles. For example, it can be challenging to identify which handles are relevant or dependent handles. It can also be challenging to identify how certain handles contribute towards each other's success. It can also be challenging to leverage data for analytics of the company to identify diversified foot print of certain customers. It can also be challenging to determine how these data generate revenue for the company and what the impact of these data on a company's social media platform reputation such as that indicated by a social score such as a net promoter score (NPS).

Accordingly, it would be desirable to provide a tool which identifies and correlates relationships between and among multiple short message user names.

SUMMARY OF THE INVENTION

A system, method, and computer-readable medium are disclosed for providing a short message tool for identifying and correlating relationships between and among multiple short messages. The short message tool collates the short message data from all company related short messages and generates a report and create a map between the contents, customers and the revenue. Such a multiple short message tool defines a workflow to generate a report from multiple short messages. More specifically, in certain embodiments the customized report may be customized based on based on lines of business (LOBs), number of short messages and re-generation of short messages (referred to as re-tweets when the short messages are Twitter type short messages), favorites, and information about individual users. In certain embodiments, the workflow maps the content, customers and revenue to showcase any impact of the short messages for a particular organization.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
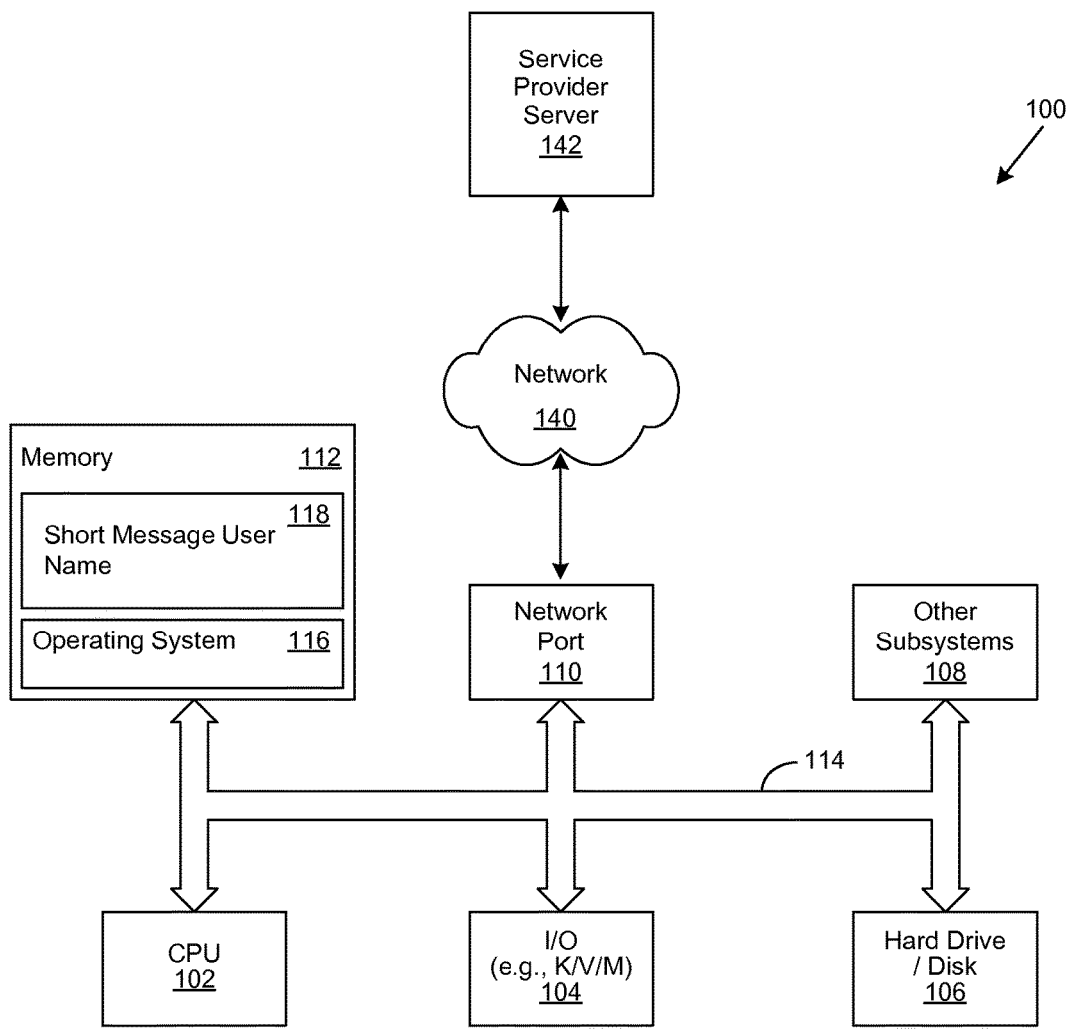
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a short message module 118.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
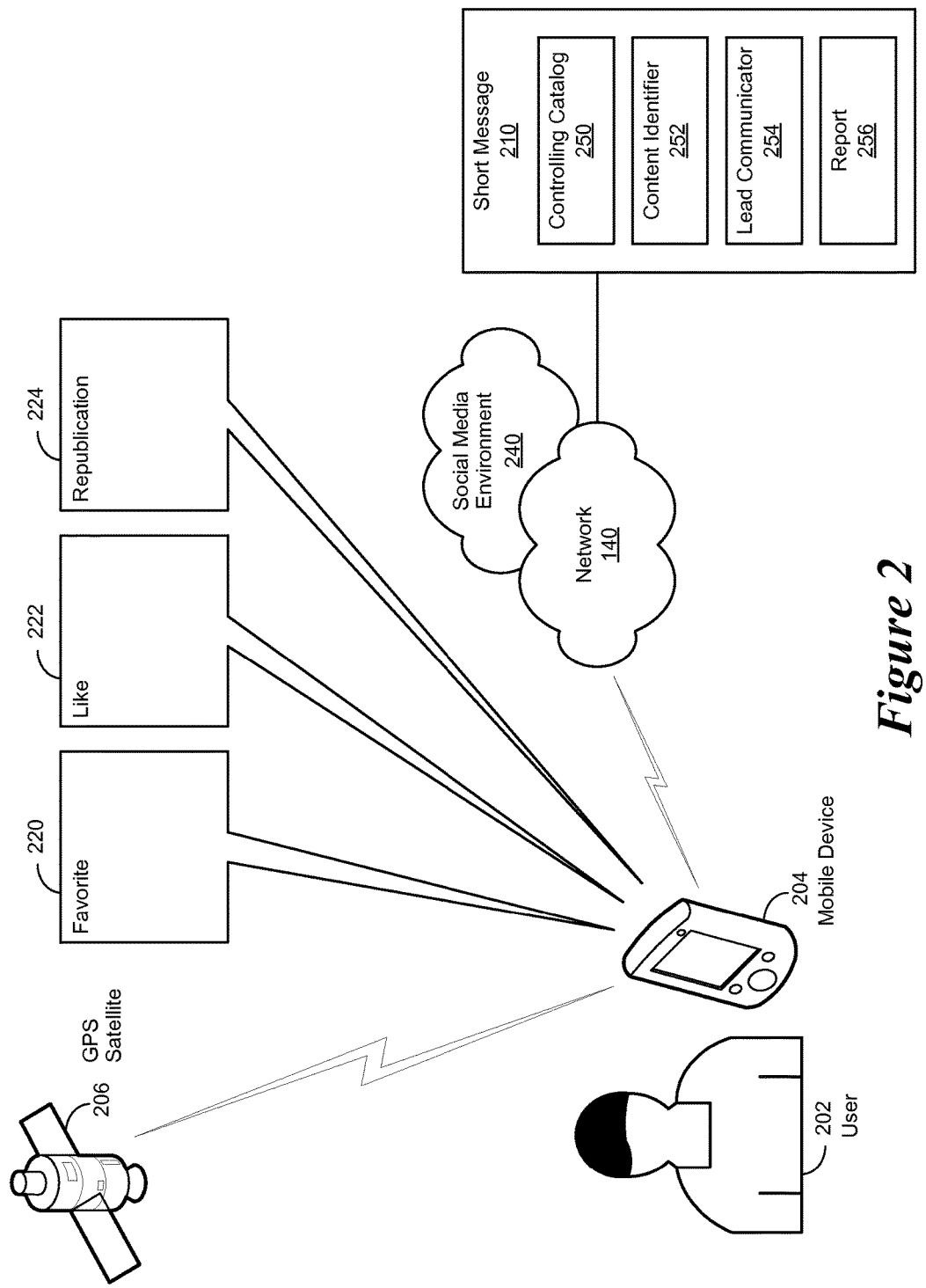
FIG. 2 shows a short message system environment.

FIG. 2 shows a simplified block diagram of the delivery of a short message implemented in accordance with an embodiment of the invention. As used herein, a short message broadly refers to a short message associated with a social media environment. In this and other embodiments, these short messages may be delivered to a mobile device 204 being used by a user 202.

As used herein, a mobile device 204 refers to wireless devices such as mobile telephones, smart phones, personal digital assistants (PDAs), tablet computers, handheld or laptop computers, and similar devices that have telecommunications capabilities. In various embodiments, the mobile device 204 is used to exchange information between a user 202 and a short message tool 210, described in greater detail herein through the use of a network 140. In certain embodiments, the network 140 is likewise used by the mobile device 204 to exchange information between the user 202 and one or more social media environments 240.

In various embodiments, the network 140 may be a public network, such as the Internet, a physical private network, a virtual private network (VPN), a wireless network, or any combination thereof. In certain embodiments, the wireless network may be a personal area network (PAN), based on technologies such as Bluetooth or Ultra Wideband (UWB). In various embodiments, the wireless network may include a wireless local area network (WLAN), based on variations of the IEEE 802.11 specification, often referred to as WiFi. In certain embodiments, the wireless network may include a wireless wide area network (WWAN) based on an industry standard including two and a half generation (2.5G) wireless technologies such as global system for mobile communications (GPRS) and enhanced data rates for GSM evolution (EDGE). In various embodiments, the wireless network may include WWANs based on existing third generation (3G) wireless technologies including universal mobile telecommunications system (UMTS) and wideband code division multiple access (W-CDMA).

Other embodiments may include the implementation of other 3G technologies, including evolution-data optimized (EVDO), IEEE 802.16 (WiMAX), wireless broadband (Wi-Bro), high-speed downlink packet access (HSDPA), high-speed uplink packet access (HSUPA), and emerging fourth generation (4G) wireless technologies. Skilled practitioners of the art will realize that many such embodiments are possible and the foregoing is not intended to limit the spirit, scope or intent of the invention.

In various embodiments, the short message may be delivered in the form of a Short Message Service (SMS) message, a Multimedia Messaging Service (MMS) message, or a Tweet® message, provided by Twitter, Inc. of San Francisco, Calif. Skilled practitioners of the art will be familiar with SMS messages, which are a text messaging service component of telephone, Web, or mobile communication systems. SMS messages are limited to a total of 160 seven-bit characters and use a stateless communications protocol, meaning every SMS message is considered independent of other messages. In certain embodiments, SMS messages may be concatenated to provide larger amounts of content within the cognitive short message. While SMS is typically implemented for person-to-person (P2P) messaging, it may also be implemented in certain embodiments for application-to-person (A2P) messaging. As an example, the short message tool 210 may be implemented to deliver a short message to a user's 202 mobile device 204.

Those of skill in the art will likewise be familiar with MMS messages, which provide a way to send messages that include multimedia content to and from mobile devices 204. Currently, the most popular use of MMS is to send photographs from camera-equipped mobile devices 204. However, MMS may implemented in various embodiments to deliver news and entertainment content as part of a cognitive short message. In certain embodiments, MMS may likewise be implemented to deliver scannable coupon codes, product images, audio, videos and other information as part of a cognitive short message.

Twitter, Inc. will likewise be familiar to skilled practitioners of the art as a social media service that allow users to send and receive short, 140 character messages, known as Tweets®. Currently, registered users of Twitter can read and post Tweets®, but unregistered users are only allowed to receive them. In various embodiments, Twitter can be accessed through a website interface, SMS, or an application implemented on a mobile device 204. In these and other embodiments, Twitter users may subscribe to Tweets® from other users, which is known as "following." In certain embodiments, Tweets® may be implemented to accommodate multimedia content. In these embodiments, the multimedia content may be provided as part of a cognitive short message delivered as a Tweet®.

Short message operations are initiated by first selecting a target user 202 and then performing ongoing monitoring operations to monitor their social media interactions, their physical location, and the current date and time. If a social media interaction 220 by the target user 202 is detected, then data associated with the social media interaction is captured. For example, the social media interaction data may include a user post 220 to a social media environment 240 (e.g., a tweet). The user post may take the form of a favorite indication within a short message 220, a like indication within a short message 222 or a republication (also referred to as a forwarding) short message 224 (e.g., a re-tweet). Additionally, in certain embodiments, the location of the user 202 may be determined through the use of Geographical Positioning System (GPS) satellite 206 data acquired by the user's mobile device 204.

In various embodiments, the short message tool 210 includes some or all of the functionality of the short message module 118. The short message tool 210 includes one or more of a controlling catalog module 250, a content identifier module 252, a lead communicator module 254 and a report module 256.

The controlling catalog module 250 includes a company short message information repository. The company short message information repository stores a list of all company related user names as well as relevant company metadata such as tag data (e.g., identified as #tag (pronounced "hashtag")). In certain embodiments, the company tag data corresponds to respective company products. It will be appreciated that the list may be expanded to include additional company related user names and/or additional relevant company tag data. In certain embodiments, this list may be expanded periodically so that user names and/or tags corresponding to some or all of an entire company product line is contained within the list. Additionally, in certain embodiments, the list may be expanded to include products and/or tags of customers as well as the company products and tags.

Additionally, in certain embodiments, the controlling catalog module 250 identifies customer driven data (e.g., customer user names and #tags). The customer driven data includes customer identified user names such as customer identified handles as well as customer identified metadata such as customer identified tag data. By capturing the customer identified data, the controlling catalog module 250 assists the company in determining whether to accept the customer driven data and add this customer driven data to the list within the controlling catalog module 250.

The content identifier module 252 includes intelligence to follow any company related handles, company identifiers and tweets where generic tags (e.g. #iwork4dell, #XPS13) are attached.

For tweets with generic tags the content identifier module 252 fetches organic content for a particular topic (i.e., content relating to a particular topic generated by non-company owned identifiers) and checks the data (such as the tag data) against the list included within the controlling catalog module 250. If the identifier is owned by the company (i.e., the handle contains certain predefined company keywords (such as the name of the company)), the content identifier then identifies the particular tweet for further analysis. In certain embodiments, the content identifier module 252 also includes a capability to isolate Twitter handles and an associated list of followers.

The content identifier module 252 generates a query which remains same for multiple handles as the handles are platform independent. In certain embodiments, the content identifier 252 includes a temporary repository to hold information on the tweet which is to be used by the lead communicator module 254. Once the data is identified by the content identifier module 252, the content identifier module 252 passes information relating to the particular thread to the lead communicator module 254 for further processing. For all company owned identifiers, the content identifier module 252 passes the short message data directly to lead communicator module 254.

The lead communicator module 254 uses the tweet data provided by content identifier module 252 and uses tag specific information available within the controlling catalog module 250 to helps the report module 256 to generate reports. In certain embodiments, while analyzing the short message data the lead communicator module 254 performs a filter function to associate with short message with at least one category (e.g., by filtering short message data based upon a line of business (LOB)). In certain embodiments, the short messages may include particular keywords representing a particular line of business. Once the content identifier module 252 passes the data for further processing, the lead communicator module 254 analyzes the short message data for certain short message factors. In various embodiments, the short message factors include number of republications of the short message (e.g., re-tweets), favorites (i.e., whether a favorites indication has been actuatued), clicks on links, individual associated IDs, and non-followers for the particular short message. Each short message is processed across a set of instructions (i.e., a set of queries analyzing various factors of the short message), and that particular query result is associated with a corresponding category such as a corresponding line of business.

Once the short message has been analyzed for the short message factors, the lead communicator module 254 updates the short message data for this short message to include information relating to the analyzed short message factors.

The report module 256 executes a workflow to generate any of a plurality of short message reports based on the information generated by the lead communicator module 254. Additionally, in certain embodiments, the report module 256 includes an internal modifier file which holds a revenue factor (e.g., a dollar value) for each of the individual factors of a short message. In various embodiments, the short message factors each include a corresponding value modifier. The value modifier is related to the value of the type of short message. I.e., a republication of a short message would have a larger value than a like. Also, a value of a non company short message might have a higher value than the same type of short message that is generated by an individual within the company. The revenue factors enable the report module 256 to generates the report for individual categories of short messages (e.g., for individual lines of business).

Additionally, in certain embodiments, the lead communicator module 254 stores non company short message information within a separate repository and the report module 256 can be configured to produce a report which considers only the short message information which appears multiple times from different handles. If the same short message tag originates from the same user name repetitively, the report can be configured to ignore such short messages.

Figure 3:
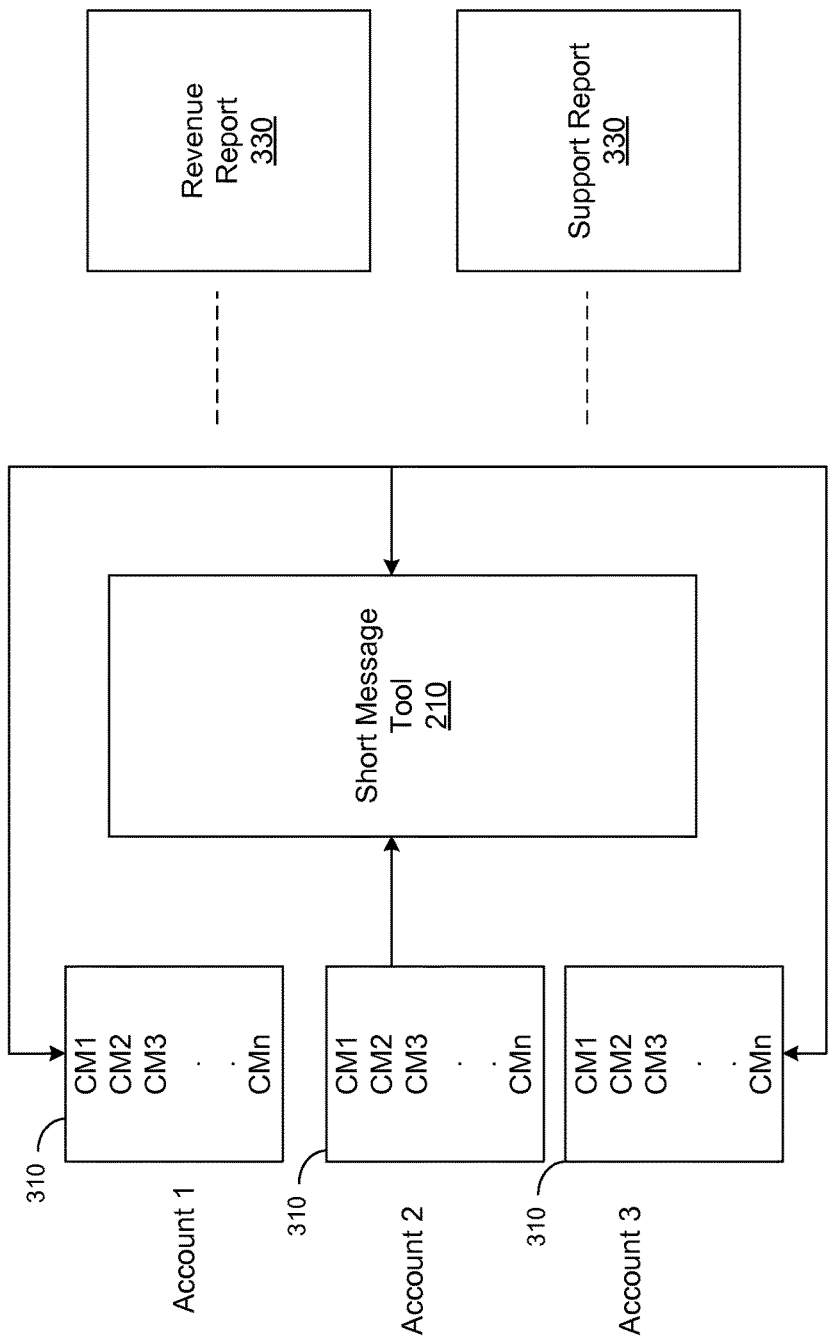
FIG. 3 shows a block diagram of an overview of a short message flow.

FIG. 3 shows a block diagram of an overview of the operation of the short message tool 210. More specifically, the short message tool 210 receives information from a plurality of short message accounts 310 (Account 1, Account 2, and Account 3). Each short message account may include some or all of a plurality of different types of short messages including favorite type short messages (CM1), like type short messages (CM2) and a forwarding type short message (CM3). The user accounts 310 include company user accounts as well as customer user accounts.

The short message tool 210 analyzes each of the short message accounts 310 and generates reports based upon the analysis. The reports can include a revenue report 330 which provides an indication of a revenue impact of the various user accounts and short messages within the user accounts. The reports can also include a support report 332 which assists the company in the management of the various company and non-company user accounts.

Figure 4:
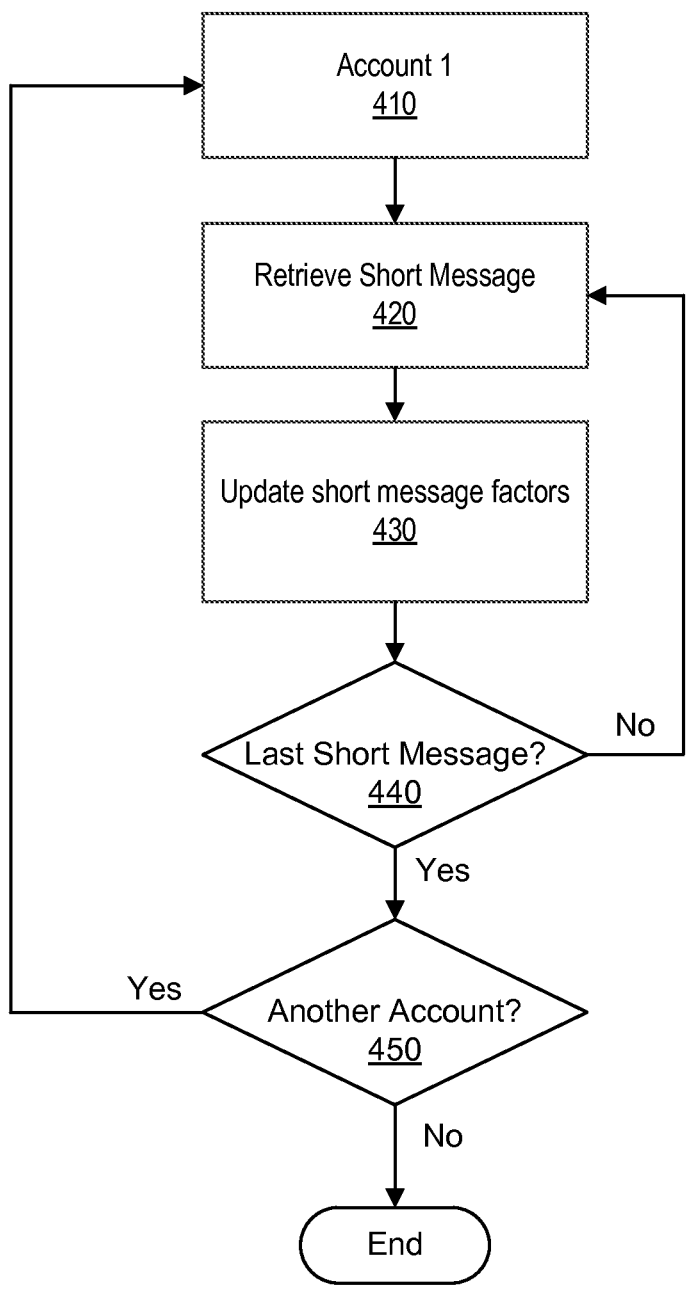
FIG. 4 shows a flow chart of the operation of a short message tool when performing an analysis of short messages from within the company.

FIG. 4 shows a flow chart of the operation of a short message tool 210 when performing an analysis of short messages from within the company. This analysis is performed on a per account basis. More specifically, the analysis begins at step 410 by accessing a first short message account. Next, at step 420, the short message tool 210 retrieves a short message and stores this short message within the temporary repository of the content identifier module 252. Next at step 430, the short message tool 210 updates a number of short message factors for the user account. These factors include number of republications of the short message (e.g., re-tweets), favorites, clicks on links, individual associated IDs, and non-followers for the particular short message. Next, at step 440 the short message tool 210 determines whether the short message being analyzed is the last message for the present user account. If not, then the short message tool 210 returns to step 420 to retrieve the next short message. If so, then the short message tool 210 proceeds to step 450 to determine whether the present user account is the last user account to be analyzed. If not, then the short message tool 210 returns to step 410 to begin processing the next user account. If so, then the short message tool 210 completes operation.

Figure 5:
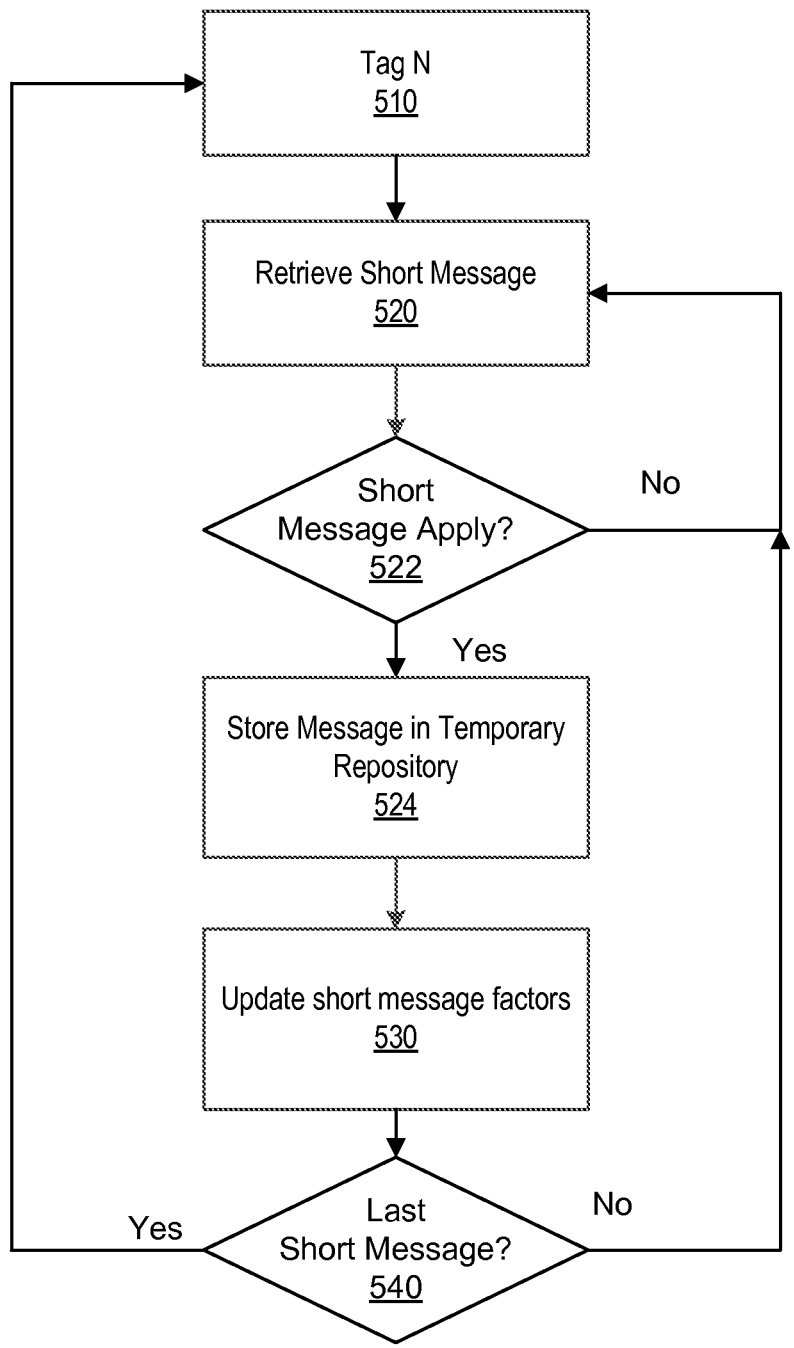
FIG. 5 shows a flow chart of the operation of the short message tool when performing an analysis of short messages from outside of the company.

FIG. 5 shows a flow chart of the operation of the short message tool when performing an analysis of short messages from outside of the company. This analysis is performed on a per user identifier basis. More specifically, the analysis begins at step 510 by accessing a first user identifier. Next, at step 520, the short message tool 210 retrieves a short message and stores this short message within the temporary repository of the content identifier module 252. Next, at step 522, the short message tool 210 determines whether the short message applies to a particular item of interest for the company. E.g., in one embodiment, the short message tool 210 determines whether the short message applies to a particular line of business of the company. If not, then the short message tool 210 returns to step 520 to retrieve the next short message for this user identifier. If so, then the short message tool 210 stores this short message within the temporary repository of the content identifier module 252 at step 524.

Next at step 530, the short message tool 210 updates a number of short message factors for the user account. These factors include number of republications of the short message (e.g., re-tweets), favorites, clicks on links, individual associated IDs, and non-followers for the particular short message. Next, at step 540 the short message tool 210 determines whether the short message being analyzed is the last message for the present user identifier. If not, then the short message tool 210 returns to step 520 to retrieve the next short message. If so, then the short message tool 210 completes operation.

Figure 6:
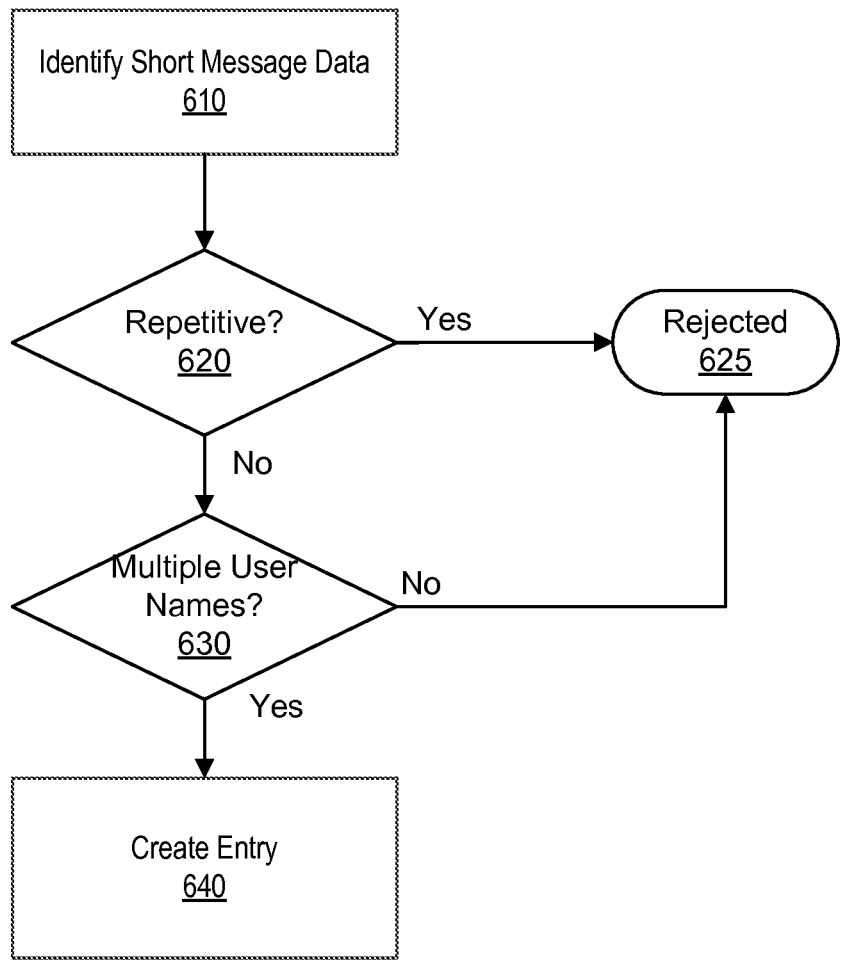
FIG. 6 shows a flow chart of the operation of a short message tool when generating a report based upon short messages.

FIG. 6 shows a flow chart of the operation of a short message tool when generating a report based upon short messages. More specifically, the operation begins with the short message tool 210 identifying non-company short message data that is stored within the controlling catalog module 250 at step 610. Next at step 620, the short message tool determines whether the short message data is repetitive. If so, then the short message data is rejected at step 625 and no further analysis is performed on the particular short message data. If the short message data is not repetitive, then the short message tool 210 determines whether the short message data is generated by multiple non-company user names at step 630. If not, then the short message data is rejected at step 625. If so, then an entry is created within the support report at step 640. The entry enables the company to quickly and efficiently address any issue present within the short message. By addressing the issue identified within the short message, a customer call to a company customer support will likely be avoided. Additionally, addressing the issue based upon identifying the issue within the short message will likely increase the company's NPS score.

Additionally, the report may be used by company support personnel to respond to the issue via a company authentic identifier within a company short message. Such a response generates more social signals and increases the trustworthiness of the content within company social media sources, for both in-bound and out-bound social media links.

As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for identifying relationships between a plurality of short messages within a short message system environment, the short message system environment comprising a mobile device, a social media environment and a short message tool, the mobile device, social media environment and short message tool communicating via a network, the method comprising:
  receiving information from a plurality of short message accounts, each of the plurality of short message accounts comprising a different type of short message, each short message comprising at least one of a Short Message Service (SMS) message, a Multimedia Message Service (MMS) message and a Tweet type message;
  collating, via the short message tool, short message data from a plurality of short messages generated by a company via a respective plurality of mobile devices, the plurality of short messages corresponding to a respective plurality of short message user names, each of the respective plurality of short message user names targeting specific audiences associated with a business of the company, each of the respective plurality of short messages comprising a respective different type of short message;
  identifying, via the short message tool, a short message factor within the short message data, the short message factor being relevant to the company; and,
  reporting, via the short message tool, information relating to relationships between the plurality of short messages of the company based upon the short message factor.

2. The method of claim 1, wherein:
the reporting is based upon at least one of lines of business (LOBs), number of short messages and re-generation of short messages.

3. The method of claim 1, wherein:
the short message comprises a Twitter type short message.

4. The method of claim 1, wherein:
the reporting comprises a workflow representing content, customers and revenue related to the short messages.

5. The method of claim 1, wherein:
the short message factor comprises one of a plurality of types of short message factors; and,
the identifying a short message factor comprises assigning a value to the short messaged based upon a type of short message factor from the plurality of short message factors.

6. The method of claim 1, further comprising:
collating short message data from short messages generated external to the company related to products of the company; and,
identifying the short message factor within the short message data of the short messages generated external to the company.

7. A system comprising:
a processor;
a data bus coupled to the processor; and
a non-transitory, computer-readable storage medium embodying computer program code for identifying relationships between a plurality of short messages within a short message system environment, the short message system environment comprising a mobile device, a social media environment and a short message tool, the mobile device, social media environment and short message tool communicating via a network, the non-transitory, computer-readable storage medium being coupled to the data bus, the computer program code interacting with a plurality of computer operations and comprising instructions executable by the processor and configured for:
  receiving information from a plurality of short message accounts, each of the plurality of short message accounts comprising a different type of short message, each short message comprising at least one of a Short Message Service (SMS) message, a Multimedia Message Service (MMS) message and a Tweet type message;
  collating, via the short message tool, short message data from a plurality of short messages generated by a company via a respective plurality of mobile devices, the plurality of short messages corresponding to a respective plurality of short message user names, each of the respective plurality of short message user names targeting specific audiences associated with a business of the company, each of the respective plurality of short messages comprising a respective different type of short message;
  identifying, via the short message tool, a short message factor within the short message data, the short message factor being relevant to the company; and,
  reporting, via the short message tool, information relating to relationships between the plurality of short messages of the company based upon the short message factor.

8. The system of claim 7, wherein:
the reporting is based upon at least one of lines of business (LOBs), number of short messages and re-generation of short messages.

9. The system of claim 7, wherein:
the short message comprises a Twitter type short message.

10. The system of claim 7, wherein:
the reporting comprises a workflow representing content, customers and revenue related to the short messages.

11. The system of claim 7, wherein:
the short message factor comprises one of a plurality of types of short message factors; and,
the identifying a short message factor comprises assigning a value to the short messaged based upon a type of short message factor from the plurality of short message factors.

12. The system of claim 7, wherein computer program code further comprises instructions executable by the processor and configured for:

collating short message data from short messages generated external to the company related to products of the company; and, identifying the short message factor within the short message data of the short messages generated external to the company.

13. A non-transitory, computer-readable storage medium embodying computer program code for identifying relationships between a plurality of short messages within a short message system environment, the short message system environment comprising a mobile device, a social media environment and a short message tool, the mobile device, social media environment and short message tool communicating via a network, the computer program code comprising computer executable instructions configured for:

receiving information from a plurality of short message accounts, each of the plurality of short message accounts comprising a different type of short message, each short message comprising at least one of a Short Message Service (SMS) message, a Multimedia Message Service (MMS) message and a Tweet type message;

collating, via the short message tool, short message data from a plurality of short messages generated by a company via a respective plurality of mobile devices, the plurality of short messages corresponding to a respective plurality of short message user names, each of the respective plurality of short message user names targeting specific audiences associated with a business of the company, each of the respective plurality of short messages comprising a respective different type of short message;

identifying, via the short message tool, a short message factor within the short message data, the short message factor being relevant to the company; and, reporting, via the short message tool, information relating to relationships between the plurality of short messages of the company based upon the short message factor.

14. The non-transitory, computer-readable storage medium of claim 13, wherein the reporting is based upon at least one of lines of business (LOBs), number of short messages and re-generation of short messages.

15. The non-transitory, computer-readable storage medium of claim 13, wherein:

the short message comprises a Twitter type short message.

16. The non-transitory, computer-readable storage medium of claim 13, wherein:

the reporting comprises a workflow representing content, customers and revenue related to the short messages.

17. The non-transitory, computer-readable storage medium of claim 13, wherein:

the short message factor comprises one of a plurality of types of short message factors; and, the identifying a short message factor comprises assigning a value to the short messaged based upon a type of short message factor from the plurality of short message factors.

18. The non-transitory, computer-readable storage medium of claim 13, wherein the computer program code further comprises computer executable instructions configured for:

collating short message data from short messages generated external to the company related to products of the company; and, identifying the short message factor within the short message data of the short messages generated external to the company.

* * * * *